US005866095A

United States Patent [19]

McGeever et al.

[11] Patent Number: 5,866,095

[45] Date of Patent: Feb. 2, 1999

[54] METHOD AND SYSTEM OF FORMATION AND OXIDATION OF DISSOLVED ATOMIC CONSTITUTENTS IN A MOLTEN BATH

[75] Inventors: Casey E. McGeever, Hanover; Christopher J. Nagel, Boston, both of Mass.

[73] Assignee: Molten Metal Technology, Inc., Waltham, Mass.

[21] Appl. No.: 784,045

[22] Filed: Jan. 17, 1997

Related U.S. Application Data

[63] Continuation of Ser. No. 737,199, Jul. 29, 1991, abandoned.

[51] Int. Cl.[6] ................................ A62D 3/00; C02F 1/72

[52] U.S. Cl. .................................. 423/659; 423/DIG. 12; 423/210.5; 588/201; 588/205

[58] Field of Search ................................ 423/415.1, 659, 423/DIG. 12, DIG. 20, 210.5; 266/224, 243; 588/201, 207, 205

[56] References Cited

U.S. PATENT DOCUMENTS

| | | | |
|---|---|---|---|
| 94,995 | 9/1869 | Bessemer | 266/243 |
| 2,562,813 | 7/1951 | Ogorzaly et al. | 266/221 |
| 3,668,120 | 6/1972 | Patterson | 210/60 |
| 3,706,549 | 12/1972 | Knuppel et al. | 75/60 |
| 4,003,683 | 1/1977 | Powell, Jr., et al. | 425/6 |
| 4,244,180 | 1/1981 | Rasor | 60/39.04 |
| 4,345,990 | 8/1982 | Fahlström et al. | 208/11 R |
| 4,389,246 | 6/1983 | Okamura et al. | 75/60 |
| 4,537,626 | 8/1985 | Pfeiffer et al. | 75/35 |
| 4,552,667 | 11/1985 | Shultz | 210/757 |
| 4,574,714 | 3/1986 | Bach et al. | 110/346 |
| 4,602,574 | 7/1986 | Bach et al. | 110/346 |
| 4,681,599 | 7/1987 | Obkircher | 48/92 |
| 4,741,770 | 5/1988 | Andrews et al. | 75/23 |
| 4,931,167 | 6/1990 | Wilwerding | 208/262.5 |
| 5,050,848 | 9/1991 | Hardie et al. | 266/81 |
| 5,177,304 | 1/1993 | Nagel | 588/201 |
| 5,191,154 | 3/1993 | Nagel | 588/201 |
| 5,298,233 | 3/1994 | Nagel | 423/580.1 |
| 5,301,620 | 4/1994 | Nagel et al. | 110/346 |
| 5,322,547 | 6/1994 | Nagel et al. | 75/414 |
| 5,435,982 | 7/1995 | Wilkinson | 423/437 R |
| 5,436,210 | 7/1995 | Wilkinson et al. | 588/201 |
| 5,585,532 | 12/1996 | Nagel | 588/201 |

FOREIGN PATENT DOCUMENTS

| | | |
|---|---|---|
| 0024250 A1 | 2/1981 | European Pat. Off. . |
| 3212534 A1 | 10/1983 | Germany . |
| DE. 3608005 A1 | 10/1987 | Germany . |
| DE.3725017 A1 | 2/1989 | Germany . |
| 0175207 | 12/1988 | United Kingdom . |
| 8705634 A | 9/1987 | WIPO . |

*Primary Examiner*—Gary P. Straub
*Assistant Examiner*—Timothy C. Vanoy
*Attorney, Agent, or Firm*—Hamilton, Brook, Smith & Reynolds, P.C.

[57] ABSTRACT

A method and system is disclosed for converting a feed, such as a carbonaceous waste, to dissolved atomic constituents for subsequent oxidation of the dissolved atomic constituents. The feed is injected into a molten bath which, at a sufficient temperature, causes conversion of essentially all of the feed to its atomic constituents, such as atomic carbon. Essentially all of the atomic constituents which are to be oxidized in the molten bath dissolve in the molten bath. An oxidant is injected into the molten bath at a rate sufficient to cause the oxidant to exothermically react with the dissolved atomic constituents to heat at least a portion of the molten bath. The heated portion is thereafter exposed to subsequently injected feed, whereby essentially all of the subsequently injected feed is converted to atomic constituents, and whereby essentially all of the atomic constituents which are to be oxidized in the molten bath dissolve in the molten bath, thereby converting the feed to the dissolved atomic constituents for subsequent oxidation of the dissolved atomic constituents.

16 Claims, 2 Drawing Sheets

METHOD AND SYSTEM OF FORMATION AND OXIDATION OF DISSOLVED ATOMIC CONSTITUTENTS IN A MOLTEN BATH

RELATED APPLICATION

This application is a continuation of application Ser. No. 07/737,199 filed Jul. 29, 1991, now abandoned, which is incorporated herein by reference in its entirety.

BACKGROUND OF THE INVENTION

Disposal of hazardous wastes has become an increasing problem because of diminishing availability of space and a growing awareness of contamination of the environment by conventional methods of disposal, such as by dumping and incineration. Toxins present in hazardous wastes often decompose at a rate which is substantially slower than the decomposition rate of other types of wastes, such as paper and metal components found in municipal rubbish. Release of toxins to the environment contaminates water supplies, and introduction of toxins to the atmosphere, such as by incomplete incineration of hazardous wastes, can pollute the atmosphere and generally diminish the quality of life in surrounding populations.

Landfills are becoming less available as a means of disposing of wastes. In the absence of suitable landfills, hazardous wastes often must be converted to benign and, preferably, useful substances. There has been tremendous investment in development of alternate methods for suitably treating hazardous wastes. Various types of reactors which have been employed for decomposition of hazardous wastes include, for example, liquid injection, multiple hearth, multiple chamber, fluidized bed, molten salt and high-efficiency boiler reactors. However, many systems release gases which must be contained or destroyed. Often these gases are burned, which generally causes formation of molecular fragments or free radicals because of the short residence time of the gases at flame temperature.

A more recent method for disposing of hazardous wastes includes introduction of the wastes into a molten bath. The molten bath is at a temperature which is sufficient to convert at least a portion of the hazardous waste to its atomic constituents. For example, hydrocarbons introduced to the molten bath are reduced to atomic carbon and atomic hydrogen. The atomic constituents can then either remain within the molten bath or react with other components of the molten bath to form more stable compounds.

One problem commonly associated with decomposition of hazardous wastes in molten metal baths is volatilization and release of components of the hazardous wastes from the molten bath before conversion to the atomic constituents of the hazardous wastes is complete. The components can be volatilized components of the hazardous wastes or molecular fragments of such components. Both the components and fragments thereof are often toxic and generally require that off-gases generated by the molten bath be processed to remove the toxins from the off-gases before the off-gases are released to the atmosphere. Toxins which are collected typically must be further treated, such as by return to the molten bath, for completion of decomposition reactions forming atomic constituents and the subsequent formation of more stable compounds, such as carbon monoxide and water.

One attempt to diminish the amount of toxins released from a molten bath includes injection of hazardous wastes beneath the surface of the molten bath. One example of a method for introducing hazardous wastes beneath the surface of a molten bath is by directing a consumable lance, containing the hazardous wastes, into the bath. The lance is degraded by the molten bath, while releasing the waste into the bath beneath the surface. However, use of a consumable lance limits introduction of waste to staggered operation, increases environmental risk due to handling of the lance and requires addition of materials other than the waste, such as the materials in the lance itself, into the molten bath.

A method of continuously injecting waste, such as carbonaceous waste, into a molten bath, includes directly injecting the waste beneath the surface of the bath through a tuyere, which typically includes one tube concentrically disposed within at least one other tube. Generally, an oxidant, such as oxygen, is directed through a central tube of the tuyere, while the waste is conjointly and continuously directed through a tube surrounding the central tube. Similarly, a third tube can be employed to direct a coolant, or shroud gas, into the molten bath at the point of injection of oxidant and waste into the molten bath.

Continuous and conjoint introduction of the oxidant and waste into the molten bath is typically required in order to prevent capping of the tuyere tube by metal at the point of injection. Capping can be caused by endothermic conversion of the waste upon injection to the molten bath. The oxidant exothermically reacts with the atomic constituents formed by conversion of the waste, thereby maintaining a temperature at the tuyere tube which is sufficient to prevent capping. A shroud gas, such as argon or methane, is introduced through the outermost tube to prevent premature wear of the tuyere tube as a consequence of exposure to the heat of the molten bath and exothermic reaction of the oxygen upon introduction to the molten bath.

However, conjoint introduction of the waste and oxidant at a single point within the reactor, such as through a tuyere tube, can cause the waste and oxidant to blow through the molten bath to a gas layer disposed above the molten bath, thereby allowing direct release of waste and partially decomposed toxic components of the waste to the atmosphere. Further, partial reaction occurring in the tuyere envelope, caused by conjoint introduction of the waste and oxidant, can cause release of incompletely decomposed waste to the gas layer and incomplete oxidation of atomic constituents formed by conversion within the molten bath. Portions of the molten bath can thereby become saturated in atomic constituents, such as carbon, or the molecular fragments may have reduced solubility, relative to atomic species in the molten bath, consequently diminishing the rate of subsequent conversion and causing additional release of such waste from the molten bath into the atmosphere.

A need exists, therefore, for a new method and system for converting a waste feed to its atomic constituents for subsequent oxidation of the atomic constituents, which overcomes or minimizes the above-mentioned problems.

SUMMARY OF THE INVENTION

The present invention relates to a method and system for converting a feed to a dissolved atomic constituent for subsequent oxidation of the dissolved atomic constituent.

The method includes injecting the feed into a molten bath, whereby essentially all of the feed is converted to the atomic constituent and whereby essentially all of the atomic constituent which is to be oxidized in the molten bath dissolves in the molten bath. An oxidant is injected into the molten bath at a rate, relative to the rate of injection of the feed, sufficient to cause the oxidant to react with the dissolved atomic constituent, whereby at least a portion of the molten bath is maintained at a temperature sufficient to convert subsequently injected feed to the atomic constituent and to dissolve essentially all of the subsequently formed atomic constituent which is to be oxidized in the molten bath. Feed is subsequently injected into the molten bath at a heated portion of the molten bath having a temperature sufficient to convert essentially all of the feed to the atomic constituent and to dissolve essentially all of the atomic constituent which is to be oxidized in the molten bath, thereby converting the feed to the dissolved atomic constituent for subsequent oxidation of the dissolved atomic constituent.

The system includes means for injecting the feed into a molten bath, whereby essentially all of the feed is converted to the atomic constituent and whereby essentially all of the atomic constituent which is to be oxidized in the molten bath dissolves in the molten bath. Suitable means inject an oxidant into the molten bath at a rate, relative to the rate relative to the rate of injection of the feed, sufficient to cause the oxidant to react with the dissolved atomic constituent, whereby at least a portion of the molten bath is maintained at a temperature sufficient to convert subsequently injected feed to the atomic constituent and to dissolve essentially all of the subsequently formed atomic constituent which is to be oxidized in the molten bath. Suitable means subsequently inject the feed in to the molten bath at a heated portion of the molten bath having a temperature sufficient to convert essentially all of the feed to the atomic constituent and to dissolve essentially all of the atomic constituent which is to be oxidized in the molten bath, thereby converting the feed to the dissolved atomic constituent for subsequent oxidation of the dissolved atomic constituent.

This invention has several advantages. For example, essentially all of the feed is converted to the atomic constituent to be oxidized. Also, essentially all of the atomic constituent which is to be oxidized in the molten bath dissolves in the molten bath. An oxidant can be injected into the molten bath for reaction with the dissolved atomic constituent at a point remote from the location of injection of the feed, or at a different time, such as by intermittent or alternating injection of feed and oxidant.

Dissolution of essentially all of the atomic constituent which is to be oxidized in the molten bath before reaction of the dissolved atomic constituent with the oxidant significantly reduces the amount of feed and components thereof, such as polyaromatic compounds, which are released from the molten bath. Further, separate injection of the feed and oxidant can significantly reduce the incidence of passing through, or blowing through, by the feed and components thereof, such as toxins, out of the molten bath directly into the atmosphere. In addition, maintaining the concentration of the atomic constituent below the point of saturation at the point of introduction of the feed into the molten bath significantly increases the rate of conversion of the feed to its atomic constituents, such as to atomic carbon. The rate of conversion of the feed to innocuous and relatively stable end products, such as carbon dioxide and water, is thereby significantly increased and the amount of toxins released from the molten bath is significantly diminished. Also, separate introduction of the feed and oxidant enables significantly increased control over thermal and mass flow patterns within the molten bath.

DETAILED DESCRIPTION OF THE INVENTION

The features and the details of the method will now be more particularly described with reference to the accompanying figures and pointed out in the claims. It will be understood that particular embodiments of the invention are shown by way of illustration and not as limitations of the invention. The same number present in different figures represents the same item. The principle functions of this invention can be employed in various embodiments without departing from the scope of the invention.

The present invention generally relates to a method and system for converting a feed to an atomic constituent for subsequent oxidation of the atomic constituent. Bach et al., U.S. Pat. Nos. 4,754,714 and 4,602,574, disclose a molten bath, such as is used in a steel-making facility, which destroys polychlorinated biphenyls and other organic wastes, optionally together with inorganic wastes. Nagel, U.S. patent application Ser. No. 07/557,561, filed Jul. 24, 1990 now U.S. Pat. No. 5,177,304, discloses a method and system for forming carbon dioxide from carbonaceous materials in a molten bath of immiscible metals. The teachings of U.S. Pat. Nos. 4,754,714 and 4,602,574, and of U.S. patent application Ser. No. 07/557,561 now U.S. Pat. No. 5,177,304 are incorporated herein by reference.

Figure 1:
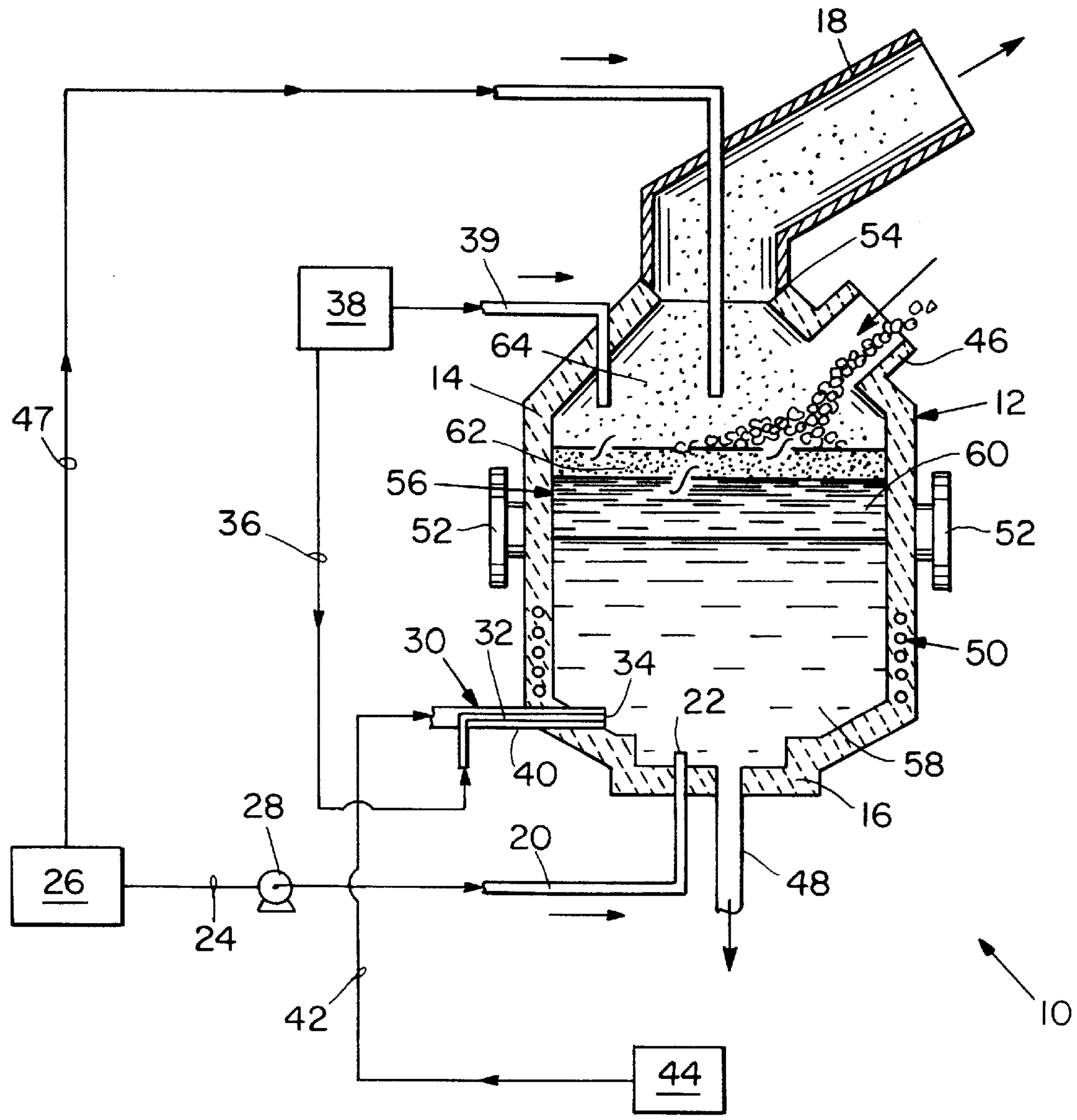
FIG. 1 is a schematic representation of one illustration of the system of the present invention.

In one embodiment of the invention, illustrated in FIG. 1, system 10 includes reactor 12. The examples of suitable vessels include K-BOP, Q-BOP, argon-oxygen decarbonization furnaces (AOD), EAF, etc., such as are known in the art. Reactor 12 includes upper portion 14 and lower portion 16. Off-gas outlet 18 extends from upper portion 14 and is suitable for conducting an off-gas composition out of reactor 12.

Feed inlet tube 20 includes feed inlet 22 and extends from lower portion 16 of reactor 12. Line 24 extends between feed source 26 and feed inlet tube 20. Pump 28 is disposed at line 24 for directing feed from feed source 26 to feed inlet tube 20. Alternatively, feed can be directed into reactor 12 through a tuyere, not shown, disposed at reactor 12, whereby a suitable shroud gas is injected into a molten bath with the feed.

Oxidant tuyere 30 is disposed at lower portion 16 of reactor 12. Oxidant tuyere 30 includes oxidant inlet tube 32 for injection of oxidant at oxidant inlet 34. Line 36 extends between oxidant inlet tube 32 and oxidant source 38. Outer tube 40 of oxidant tuyere 30 is disposed concentrically about oxidant inlet tube 32 at oxidant inlet 34. Line 42 extends between outer tube 40 and shroud gas source 44 for conducting a suitable shroud gas from shroud gas source 44 to oxidant inlet 34. Oxidant can also be conducted from oxidant source 38 through line 39 into reactor 12.

It is to be understood, however, that more than one feed inlet tube and/or more than one oxidant inlet tube can be disposed at lower portion 16 of reactor 12 for introduction of a feed and oxidant into reactor 12. Further, it is to be understood that other methods of introducing feed into reactor 12 can be employed in addition to injection through feed inlet tube 20. For example, a consumable lance or other suitable feed can be introduced to reactor 12 through port 46, which is disposed at upper portion 14 of reactor 12. Examples of suitable feed for introduction to reactor 12 through port 46 include paper, lumber, tires, coal, etc. In another embodiment, feed can also be conducted from feed source 26 through line 47 to reactor 12.

Bottom-tapping spout 48 extends from lower portion 16 and is suitable for removal of molten metal from reactor 12.

Additional drains can be provided as a means of continuously or intermittently removing distinct phases from reactor 12. Material in reactor 12 can also be removed by other methods, such as are known in the art. For example, such material can be removed from reactor 12 by rotating reactor 12 and employing a launder, not shown, extending from a tap hole, not shown, or through port 46.

Induction coil 50 is disposed at lower portion 16 for heating reactor 12 or for initiating generation of heat within reactor 12. It is to be understood that, alternatively, reactor 12 can be heated by other suitable means, such as by oxyfuel burners, electric arc, etc. Trunions 52 are disposed at reactor 12 for manipulation of reactor 12. Seal 54 is disposed between off-gas outlet 18 and is suitable for allowing partial rotation of reactor 12 about trunions 52 without breaking seal 54. It is to be understood that, alternatively, no trunions 52 or seal 54 are disposed at reactor 12 and that reactor 12 does not rotate.

Molten bath 56 is disposed within reactor 12. In one embodiment, molten bath 56 includes at least one metal phase having a free energy of oxidation, at the operating conditions of system 10, which is greater than that of conversion of atomic carbon to carbon monoxide. Examples of suitable metal components of molten bath include iron, chromium, manganese, copper, nickel, cobalt, etc. It is to be understood that molten bath 56 can include more than one metal. For example, molten bath 56 can include a solution of metals. Also, it is to be understood that molten bath 56 can include oxides of the molten metals.

Molten bath 56 includes first molten metal phase 58 and second molten metal phase 60, which is substantially immiscible in first molten metal phase 58. The solubility of atomic constituent in second molten metal phase 60 can be significantly less than in first molten metal phase 58. First molten metal phase 58 has a free energy of oxidation, at the operating conditions of system 10, greater than oxidation of atomic carbon to form carbon monoxide. Second molten metal phase 60 has a free energy of oxidation at the operating conditions of system 10 greater than that of oxidation of carbon monoxide to form carbon dioxide. Oxidation of atomic carbon, therefore, is more complete because carbon monoxide, which is formed from atomic carbon in first molten metal phase 58, is substantially converted to carbon dioxide in second molten metal phase 60. Second molten metal phase 60 is disposed above first molten metal phase 58. In another embodiment, first molten metal phase 58 and second molten metal phase 60 can form an emulsion, such as under turbulent conditions of molten bath 56 caused by injection of oxidant and feed into molten bath. An emulsion is formed because first molten metal phase 58 and second molten metal phase 60 are substantially immiscible.

Molten bath 56 is formed by at least partially filling reactor 12 with a suitable metal. The metal is then heated to a suitable temperature by activation of induction coil 50 or by other suitable means, not shown. Where two immiscible metals are introduced to reactor 12, the metals separate during melting to form first molten metal phase 58 and second molten metal phase 60. In one embodiment, the viscosity of molten bath 56 at feed inlet 22 and oxidant inlet 34 is less than about ten centipoise at the operating conditions of system 10.

Suitable operating conditions of system 10 include a temperature sufficient to at least partially convert a feed, such as by catalytic or pyrolytic conversion, to an atomic constituent. In one embodiment, the temperature is in the range of between about 1,300° and about 1,700° C.

Alternatively, molten bath 56 is formed of at least one vitreous phase, such as silicon dioxide ($SiO_2$). Typically, a vitreous phase molten bath includes at least one metal oxide having a free energy of oxidation, at the operating conditions of system 10, which is less than that of conversion of atomic carbon to carbon monoxide. Examples of suitable metal oxides of the vitreous molten bath include titanium oxide ($TiO_2$), zirconium oxide ($ZiO_2$), aluminum oxide ($Al_2O_3$), magnesium oxide (MgO), calcium oxide (CaO), silica ($SiO_2$), etc. Other examples of suitable components include halogens, sulfur, phosphorus, heavy metals, etc. It is to be understood that the vitreous molten bath can include more than one metal oxide, and can include a solution of metal oxides. The vitreous molten bath can contain more than one phase. In another embodiment, the vitreous molten bath can include at least one salt.

As shown in FIG. 1, a vitreous phase can be vitreous layer 62, which is disposed on molten bath 56. Vitreous layer 62 is substantially immiscible with molten bath 56. Vitreous layer 62 includes at least one metal oxide. In one embodiment, the metal element of the metal oxide in vitreous layer 62 has a free energy of oxidation, at operating conditions of system 10, less than the free energy of oxidation of atomic carbon to carbon monoxide. It is to be understood, however, that alternatively, system 10 does not include vitreous layer 62.

In one embodiment, the solubility of carbon in vitreous layer 62 can be less than that of molten bath 56, thereby causing atomic carbon to be retained within molten bath 56. In another embodiment, vitreous layer 62 has a lower thermal conductivity than that of molten bath 56. Radiant loss of heat from molten bath 56 can thereby be reduced to significantly below the radiant heat loss from molten bath 56 when no vitreous layer is present.

Vitreous layer 62 can be formed by directing suitable materials, such as metals, metal oxides, halogens, sulfur, phosphorous, heavy metals, sludges, etc., through port 46 into molten bath 56. Inorganic components of feed can also be included in vitreous layer 62. The materials can be directed on to the top of molten bath 56 or injected into molten bath 56, using methods such as are well known in the art. The materials can form other stable compounds at the operating conditions of system 10 by reaction, for example, with alkaline metal cations or alkaline earth metal cations. Examples of such stable reaction products include calcium fluoride ($CaF_2$) and magnesium phosphate $(MgPO_4)_2$. In one embodiment, vitreous layer 62 contains about 40% calcium oxide, about 40% silicon dioxide and about 20% aluminum oxide, and is about 5 inches thick.

A suitable feed is injected into molten bath 56 through feed inlet tube 46. An example of a suitable feed is a carbonaceous feed, such as coal or a waste which includes organic compounds. It is to be understood that feed can include inorganic components. Examples of suitable inorganic components include, but are not limited to, metals and their oxides, sulfides and halides. In addition to carbon, feed can include other atomic constituents, such as hydrogen, halides, metals, etc.

Feed is directed from feed source 26 through line 24 by pump 28 and is injected into molten bath through feed inlet tube 20. In one embodiment, feed is a fluid. Examples of suitable fluids include feed components dissolved or suspended within a liquid, and solid particles of feed components suspended in an inert gas, such as argon.

Essentially all of the feed directed into molten bath 56 is converted to its atomic constituents, such as atomic carbon, atomic hydrogen, etc. Essentially all of the atomic constituents which are to react with oxidant in molten bath 56 dissolve in molten bath 56. The dissolved atomic constituents migrate through first molten metal phase 58, such as by diffusion, convection, or by some other suitable method. At least a portion of the dissolved atomic constituents migrate to a portion of first molten metal phase 58 proximate to oxidant inlet 34.

A suitable oxidant is directed from oxidant source 38 through line 36, such as by pressurizing oxygen source 38, and is injected through oxidant inlet tube 32 into first molten metal phase 58. The oxidant is suitable for exothermic reaction with at least one of the dissolved atomic constituents in first molten metal phase 58 under the operating conditions of system 10 and formed by conversion of feed injected through feed inlet tube 20. Examples of suitable oxidants include air, oxygen, water, iron oxide, halides, etc.

The oxidant is injected into first molten metal phase 58 of molten bath 56 at a rate, relative to the rate of injection of the feed, sufficient to oxidize the dissolved atomic constituents formed by conversion of the injected feed in molten bath 56. The oxidant injected into first molten metal phase 58 exothermically reacts with at least one dissolved atomic constituent, such as atomic carbon, formed by conversion of feed injected into molten bath 56 through feed inlet tube 20. The rate of introduction of feed through feed inlet tube 20 and of oxidant through oxidant inlet tube 32 into molten bath 56 is sufficient to cause a reaction of the oxidant with the dissolved atomic constituent proximate to oxidant inlet tube 32 to generate sufficient heat to heat at least a portion of molten bath 56. In one embodiment, the amount of heat generated is sufficient to maintain molten bath 56 and vitreous layer 62 in a molten condition, whereby feed can be injected into molten bath 56, without actuation of an external heat source, such as by heating induction coil 50, etc.

The heated portion of molten bath 56 has a temperature sufficient to cause essentially all of the feed subsequently injected into molten bath 56 and exposed to the heated portion proximate to feed inlet tube 20, to be converted to its atomic constituents and to cause essentially all of the atomic constituent which is to be oxidized in molten bath 56 to dissolve. In one embodiment, the heated portion of first molten metal phase 58 has a temperature sufficient to allow conversion of subsequently injected carbonaceous feed to form atomic carbon.

The rates of injection of the oxidant and the feed are also sufficient to form stable accretions at oxidant inlet 34 and feed inlet 22. The relative rate of injection of the oxidant and feed into first molten metal phase 58 is sufficient to cause oxidation of the dissolved atomic constituents proximate to oxidant inlet tube 32 in an amount sufficient to heat at least a portion of molten bath 56 to a temperature sufficient to cause conversion of subsequently injected feed to its atomic constituents. The relative rate of injection of the oxidant and feed is also sufficient to dissolve essentially all of the atomic constituent which is to be oxidized in molten bath 56 and which is formed by exposure of the heated portion to subsequently injected feed.

The concentration of atomic constituents in the heated portion is limited to below the saturation point for the atomic constituents at the temperature of the heated portion of molten metal bath 56. For example, where first molten metal phase 58 is formed of iron, the concentration of atomic carbon in first molten metal phase 58 proximate to feed inlet 22 is limited to a concentration of less than about five percent, by weight. The concentration of atomic constituents at the heated portion is limited by controlling the relative rates of injection of the oxidant and the feed and by controlling the temperature of the heated portion of molten bath 56 at feed inlet 22.

Although the mechanism of the invention is not completely understood, it is believed that dissolving essentially all of the atomic constituents which are to be oxidized in molten bath 56 significantly increases the rate and completeness of conversion of the feed to its atomic constituents. Increased rate and completeness of conversion significantly diminishes volatilization and escape from molten bath 56 of components and partially converted molecular fragments of the feed, such as toxins, including polyaromatics, into gas phase 64 disposed above molten bath 56 and subsequent release of the components and molecular fragments to the atmosphere.

In one embodiment, the heated portion of first molten metal phase 58 is convectively transferred from oxidant inlet 34 to feed inlet 22 by a suitable means. Suitable means of convectively transferring the heated portion include, for example, an induction stirring means, an agitator, etc. The oxidant is injected into first molten metal phase 58 at an angle and at a velocity sufficient to convectively transfer the heated portion of first molten metal phase 58 from oxidant inlet 34 to feed inlet 22.

Suitable configurations for injection of the oxidant and the feed include, for example, injection of the oxidant and the feed at about right angles to each other, as shown in FIG. 1, wherein the feed is injected in an upward direction and the oxidant is injected in a generally horizontal direction. In another embodiment, the oxidant is injected in a generally upward direction and the feed is injected in a generally horizontal direction. Alternatively, the feed and oxidant can be injected into molten bath 56 in directions which are generally parallel. For example, both the feed and the oxidant are proximately injected in an upward direction. In another example, the feed can be injected in an upward direction and the oxidant can be injected in a downward direction. In still another example, the feed and the oxidant are injected coaxially into molten bath 56 in opposite directions.

Feed which is subsequently injected into molten bath 56 at feed inlet 22 is then exposed to the heated portion of first molten metal phase 58. Essentially all of the feed is converted to its atomic constituents by exposure to the heated portion. Essentially all of the atomic constituents which are to be oxidized by exposure to the oxidant injected into molten bath 56 at oxidant inlet 34, such as atomic carbon formed by conversion of organic components of the feed, dissolve in molten bath 56. The rate of conversion, and the rate of subsequent oxidation of the dissolved atomic constituents, is sufficient to limit the concentration of the atomic constituents to below the saturation points for the atomic constituents in first molten metal phase 58 at the location where the feed is injected into first molten metal phase 58.

The dissolved atomic constituents migrate to oxidant inlet 34 for exothermic reaction with oxidant injected into first molten metal phase 58 at oxidant inlet 34. For example, dissolved atomic carbon, formed by conversion of organic components of the feed, exothermically react with an oxidant, such as oxygen, to form carbon monoxide gas and carbon dioxide gas. In addition, other oxides can be formed, such as metal oxides, etc. Compounds formed by oxidation within first molten metal phase 58 can dissolve in first molten metal phase 58 and/or migrate to second molten metal phase 60 for subsequent reaction.

Oxidant injected into molten bath 56 can migrate through molten bath 56 to dissolved atomic constituents for reaction with the dissolved atomic constituents to form oxides. Also, oxidants which react with the dissolved atomic constituents can include, in addition to oxygen, such as dissolved oxygen and oxygen gas, reduceable metal oxides, such as iron oxide (FeO), nickel oxide (NiO), etc.

In one embodiment, first molten metal phase 58 has a free energy of oxidation, at operating conditions of system 10, greater than that of oxidation of atomic carbon to form carbon monoxide. Second molten metal phase 60 has a free energy of oxidation at the operating conditions of system 10 greater than that of oxidation of carbon monoxide to form carbon dioxide. Carbon monoxide formed in first molten metal phase 58 migrates from first molten metal phase 58 to second molten metal phase 60. An oxidant, such as oxygen, can be injected into second molten metal phase 60 by a suitable means, not shown, and consequently react with the carbon monoxide to form carbon dioxide. As the concentration of carbon dioxide increases and exceeds the saturation point of carbon dioxide for second molten metal phase 60 at the temperature of second molten metal phase 60, the carbon dioxide can be released from molten bath 56 into gas phase 64, which is above molten bath 56, for subsequent discharge to the atmosphere.

The rate of injection of oxidant and feed, and the rate of convective transfer of the heated portion of first molten metal phase 58 from oxidant inlet 34 to feed inlet 22 is sufficient to allow accretion at oxidant inlet 34 and feed inlet 22, to thereby protect feed inlet 22 and oxidant inlet 34 from premature failure, without allowing capping of either oxidant inlet 34 or feed inlet 22.

It is to be understood that the relative rate of injection of the feed and the oxidant can be adjusted to control the composition of off-gases generated in molten bath 56. For example, if the feed includes hydrocarbons, and the oxidant is oxygen gas, then increasing the relative rate of injection of the feed generally causes the concentration of hydrogen gas generated in molten bath 56 to increase, while, conversely, increasing the relative rate of injection of oxidant generally causes the concentration of carbon monoxide and carbon dioxide generated in molten bath 56 to increase.

It is also to be understood that the feed and oxidant can be injected into first molten metal phase 56 intermittently. For example, the feed can be injected into first molten metal phase 58 in an amount sufficient to generate a concentration of atomic carbon, essentially all of which is dissolved in molten bath 56, which is sufficient to react with an oxidant injected into first molten metal phase 58 and thereby heat at least a portion of molten bath 56. Injection of the feed can then be stopped and injection of the oxidant can be initiated to cause exothermic reaction between the oxidant and the dissolved atomic carbon in molten bath 56 to heat at least a portion of molten bath 56. At least a portion of first molten metal phase 58 which has been heated to a sufficient temperature is then convectively transferred to feed inlet 22 and injection of the oxidant is terminated. Injection of the feed is then resumed, whereby essentially all of the feed is converted in the heated portion of first molten metal phase 58 to form additional atomic carbon, essentially all of which dissolved in molten bath 56.

Figure 2:
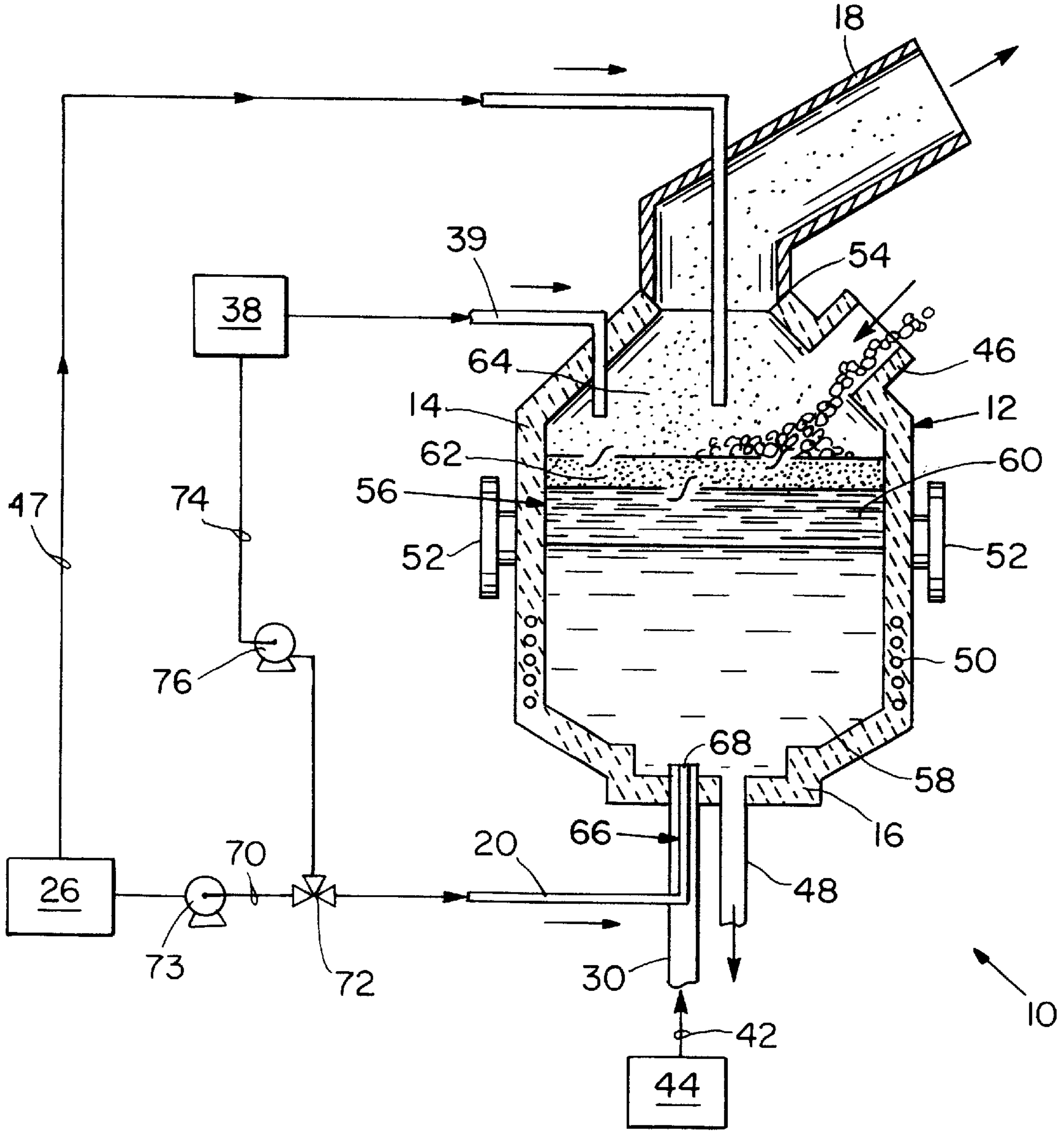
FIG. 2 is a schematic representation of an alternate embodiment of the system of the present invention.

In an alternate embodiment of the present invention, shown in FIG. 2, oxidant and feed are intermittently injected through injection tube 66 at injection inlet 68, which is disposed at lower portion 16 of reactor 12, into first molten metal phase 58. Line 70 extends between three-way valve 72 and feed source 26. Pump 73 is disposed at line 70. Line 74 extends between three-way valve 72 and oxidant source 38. Pump 76 is disposed at line 74.

Feed is directed from feed source 26 by pump 73 through line 70 and into first molten metal phase 58 through three-way valve 72 and injection inlet 68. The feed is injected into first molten metal phase 58 for a period of time and at a rate which allows conversion of essentially all of the feed to its atomic constituents, such as atomic carbon, without capping of injection inlet 68. Essentially all of the atomic constituents which are to react with the oxidant dissolve in molten bath 56. When the amount of the dissolved atomic constituents formed in molten bath 56 proximate to injection inlet 68 is sufficient to allow sufficient oxidation with oxidant to heat at least a portion of molten bath 56 to a temperature sufficient to convert essentially all of subsequently injected feed to its atomic constituents, and to dissolve essentially all of the atomic constituents which are to be oxidized in molten bath 56, injection of the feed is stopped. Injection of the feed is stopped by directing three-way valve 72 from a first position, which allows injection of the feed through three-way valve 72, to a second position, which allows injection of the oxidant through three-way valve 72 from line 74.

Oxidant is then directed by pump 72 from oxidant source 38 through line 74 and is injected into first molten metal phase 58 through three-way valve 72 and injection inlet. The rate and period of time of injection of the oxidant into first molten metal phase 58 is sufficient to heat at least a portion of molten bath 56 by exothermic reaction of the oxidant with atomic constituents, such as atomic carbon, proximate to injection inlet 68. The heated portion of molten bath 56 has a temperature sufficient to cause conversion of essentially all of the feed subsequently injected into first molten metal phase 58 to its atomic constituents and to dissolve essentially all of the atomic constituents which are to be subsequently oxidized in molten bath 56. Injection of oxidant is then terminated by moving three-way valve 72 from the second position back to the first position.

Injection of feed through injection inlet 68 into first molten metal phase 58 is then resumed. Essentially all of the subsequently feed injected into first molten metal phase 58 is converted in the heated portion of first molten metal phase 58 to its atomic constituents for subsequent reaction with additional oxidant and essentially all of the atomic constituents which are to be oxidized in molten bath 56 are dissolved. The periods of feed injection and of oxidant injection limit the concentration of the atomic constituents to be oxidized to below their saturation points at the temperature of the heated portion proximate to injection inlet 68. Conversion of the feed and oxidation of dissolved atomic constituents can thereby be maintained.

Equivalents

Those skilled in the art will recognize, or be able to ascertain using no more than routine experimentation, many equivalents of the invention described specifically herein. Such equivalents are intended to be encompassed in the scope of the following claims.

We claim:

1. A method of converting an oxidizable feed containing carbon values, comprising the steps of:

a) injecting all the feed by submerged injection into a molten bath to convert essentially all of its oxidizable component into atomic constituents and dissolving said constituents in the bath;

b) injecting separately at a seperate location or at a different time an oxidant into the molten bath in an amount which is sufficient to cause the oxidant to oxidize dissolved carbon atomic constituents and heat a portion of the molten bath; and c) injecting additional feed containing carbon values by submerged injection into the molten bath to convert essentially all of its oxidizable component into atomic constituents and dissolving said constituents in the bath.

2. A method of claim 1, wherein the feed and the oxidant are alternately injected into the molten bath.

3. A method of claim 2, wherein the feed and the oxidant are injected into the molten bath at the same location within the molten bath.

4. The method of claim 1, wherein the feed and the oxidant are injected into the molten bath at different locations.

5. A method of claim 4, wherein the oxidant is injected into the molten bath in a direction which is at about a ninety degree angle to the direction in which the feed is injected into the molten bath.

6. A method of claim 5, wherein the direction in which the oxidant is injected into the molten bath is about horizontal.

7. A method of claim 6, wherein the feed is injected into the molten bath in an upward direction.

8. A method of claim 5, wherein the direction in which the oxidant is injected into the molten bath is about vertical.

9. A method of claim 8, wherein the oxidant is injected into the molten bath in an upward direction.

10. A method of claim 8, wherein the oxidant is injected into the molten bath in a downward direction.

11. A method of claim 4, wherein the oxidant is injected into the molten bath in a direction which is about parallel to the direction in which the feed is injected into the molten bath.

12. A method of claim 11, wherein the oxidant and the feed are injected into the molten bath in an upward direction.

13. A method of claim 11, wherein the oxidant is injected into the molten bath in a downward direction.

14. A method of claim 13, wherein the feed is injected into the molten bath in an upward direction.

15. A method of claim 11, wherein the injection of the oxidant and of the feed is about coaxial.

16. A method of claim 11, wherein the feed includes a carbonaceous component and the atomic constituents include atomic carbon.

* * * * *